(12) United States Patent
Pryszo et al.

(10) Patent No.: US 7,768,447 B2
(45) Date of Patent: Aug. 3, 2010

(54) RADAR APPARATUS AND THE LIKE

(75) Inventors: Brice Pryszo, Bidart (FR); Iker Pryszo, Bidart (FR); Mathieu Jacquinot, Bidart (FR); Olivier Robin, Bidart (FR); Makoto Obuchi, Nishinomiya (JP); Koji Tokuda, Nishinomiya (JP)

(73) Assignees: MaxSea International S.A.S., Bidart (FR); Furuno Electric Co., Ltd., Nishinomiya (JP)

( * ) Notice: Subject to any disclaimer, the term of this patent is extended or adjusted under 35 U.S.C. 154(b) by 409 days.

(21) Appl. No.: 11/896,428

(22) Filed: Aug. 31, 2007

(65) Prior Publication Data

US 2009/0058718 A1   Mar. 5, 2009

(51) Int. Cl.
 *G01S 13/00* (2006.01)

(52) U.S. Cl. .............. 342/176; 342/29; 342/36

(58) Field of Classification Search ........... 342/29–41, 342/176–186; 345/660–671
See application file for complete search history.

(56) References Cited

U.S. PATENT DOCUMENTS

| | | | | |
|---|---|---|---|---|
| 3,246,330 A * | 4/1966 | Balding | .............. | 342/179 |
| 4,024,539 A * | 5/1977 | Quinlivan et al. | .......... | 342/179 |
| 4,126,858 A * | 11/1978 | Wiener | .............. | 342/183 |
| 4,484,192 A * | 11/1984 | Seitz et al. | .......... | 340/995.18 |
| 4,851,848 A * | 7/1989 | Wehner | .............. | 342/25 D |
| 4,872,012 A * | 10/1989 | Chabries | ........... | 342/25 A |
| 4,915,498 A * | 4/1990 | Malek | .............. | 356/5.04 |
| 5,554,991 A * | 9/1996 | Maitre et al. | ......... | 342/184 |
| 5,801,720 A * | 9/1998 | Norrod et al. | ......... | 345/568 |
| 5,831,637 A * | 11/1998 | Young et al. | ........ | 345/501 |
| 6,084,600 A * | 7/2000 | Munshi | ............... | 345/545 |
| 6,424,292 B1 * | 7/2002 | Fujikawa et al. | ...... | 342/185 |
| 6,621,451 B1 * | 9/2003 | Fisher et al. | ......... | 342/185 |
| 6,667,744 B2 * | 12/2003 | Buckelew et al. | ....... | 345/502 |
| 2002/0145556 A1 * | 10/2002 | Kiya | ................. | 342/176 |
| 2008/0100503 A1 * | 5/2008 | Yanagi et al. | ....... | 342/176 |

FOREIGN PATENT DOCUMENTS

WO   WO-88/00490 A1   1/1988

OTHER PUBLICATIONS

Third generation airport surface detection equipment design, Go, G. Ianniello, J.W., United Technologies Norden Systems Inc., Norwalk, CT; Aerospace and Electronics Conference, 1994. NAECON 1994., Proceedings of the IEEE 1994 National, May 23-27, 1994, pp. 1301-1308 vol. 2.*

Go et al., "Third Generation Airport Surface Detection Equipment Design", Aerospace and Electronics Conference, Proceedings of the IEEE, pp. 1301-1308. 1994.

* cited by examiner

*Primary Examiner*—Thomas H Tarcza
*Assistant Examiner*—Peter M Bythrow
(74) *Attorney, Agent, or Firm*—Birch, Stewart, Kolasch & Birch, LLP

(57) ABSTRACT

Methods and apparatuses process sensing signals. A method for redrawing a sensing image when a range is or has been changed, according to one aspect of the present invention, records the sensing image and outputs the sensing image to a display; records additional information displayed upon a screen and outputs the additional information to the display; computes a new image from the recorded sensing image using an image manipulation computer function, so that the computed image fits a new scale of the changed range, and recording the computed image; and computes changes to the recorded additional information to adjust the additional information to the new scale of the changed range, and records the computed additional information.

25 Claims, 9 Drawing Sheets

RADAR APPARATUS AND THE LIKE

BACKGROUND OF THE INVENTION

1. Field of the Invention

The present invention relates generally to sensing systems such as radar and sonar systems, and more particularly to methods and apparatuses for processing signals when a range is switched in a sensing system.

2. Description of the Related Art

Sensing apparatuses, such as radar and sonar systems, are used to identify objects such as moving ships, vehicles, and aircraft, stationary systems and formations, as well as altitude, speed, or acceleration of various objects, etc. A sensing apparatus typically transmits signals and receives emitted signals such as, for example, reflected or transmitted radiation, echo signals, etc. from external objects. The sensing apparatus uses these signals to obtain information about the objects associated with the signals. Information about the objects may include target images of objects, as well as spatial data related to the objects.

When a conventional radar apparatus is switched from one range (detection range) to another range to change a display range scale, target images stored on the previously used range become unusable, as these target images do not fit the new range scale. Hence, a conventional radar apparatus needs to erase all previously stored target images from an old range scale, in order to store new target images on a new range scale.

Figure 1:
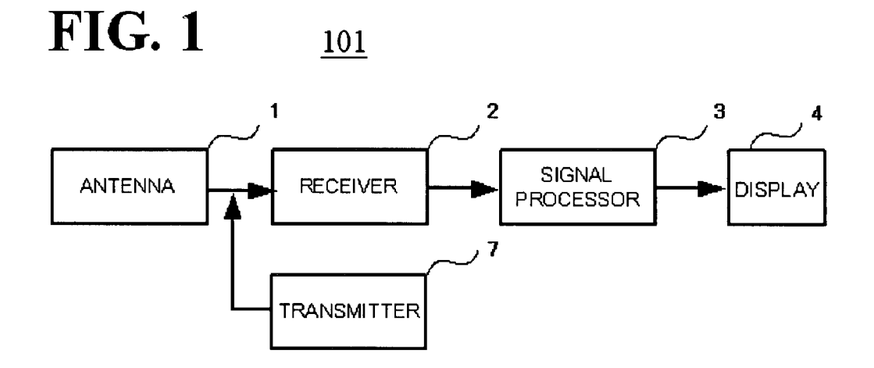
FIG. 1 is a block diagram illustrating a conventional radar apparatus.
Figure 2:
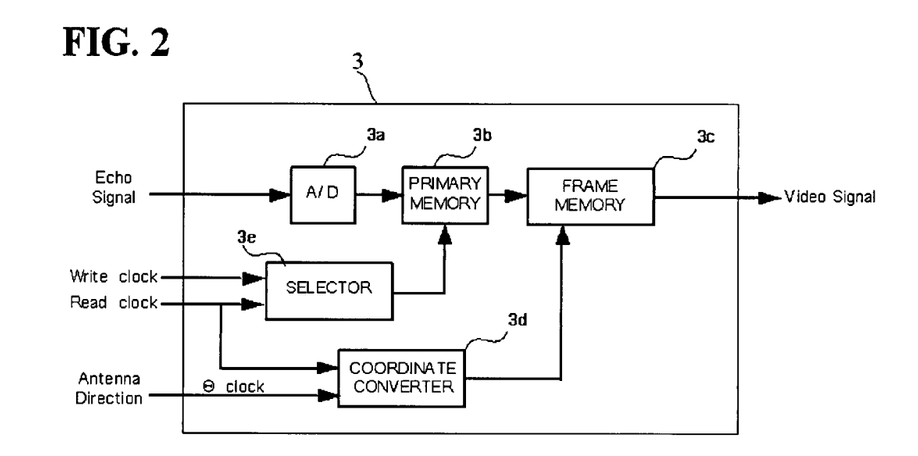
FIG. 2 is a detailed block diagram of a signal processor in a conventional radar apparatus.

FIG. 1 is a block diagram illustrating a conventional radar apparatus, and FIG. 2 is a detailed block diagram of a signal processor in a conventional radar apparatus. The conventional radar apparatus 101 illustrated in FIG. 1 includes the following components: an antenna 1; a receiver 2; a signal processor 3; a transmitter 7; and a display 4.

The radar antenna 1 rotates at a specific speed in a horizontal plane, transmits pulses of radio waves at a specific pulse repetition rate, and receives echoes of radio waves reflected by targets. The receiver circuit 2 detects and amplifies signals received by the radar antenna 1. The signal processor 3 processes signals received from receiver 2, and sends the processed signals to display 4.

The signal processor 3 of a conventional radar apparatus 101, illustrated in FIG. 2, includes the following components: an analog-to-digital (A/D) converter 3a; a primary memory 3b; a frame memory 3c; a coordinate converter 3d; and a selector 3e. In signal processor 3, the A/D converter 3a receives an echo signal from receiver 2, and converts an analog signal obtained from receiver circuit 2 into a digital signal. The primary memory 3b stores A/D-converted data for one sweep in real time. The primary memory 3b is also used as a buffer for writing the one-sweep data into frame memory 3c in a succeeding stage, until stored data in the primary memory 3b is overwritten by new one-sweep data resulting from a next transmission. The selector 3e switches a clock input to the primary memory 3b between a write clock, which is necessary when data is written data into the primary memory 3b in real time, and a read clock, which is necessary when data is transferred to the memory.

A coordinate converter 3d generates addresses representative of pixels in the frame memory 3c, for pixels arranged in a Cartesian coordinate system successively from the center of the system outward. The coordinate converter 3d also generates a start address corresponding to coordinates of the center, based on an antenna direction (Θ) referenced to a head portion of a ship, for example. The coordinate converter 3d may also generate a location in the primary memory 3b from which a signal is read out, for example. The coordinate converter 3d is typically constructed of hardware which performs operations expressed by the following equations:

$$X = r^* \cos(\theta) + Xs \tag{1}$$

$$Y = r^* \sin(\theta) + Ys. \tag{2}$$

where X and Y are coordinates of an address representative of a pixel in the frame memory, Xs and Ys are coordinates of the center address, r is the distance from the center to the pixel, and theta is the direction of a pixel for coordinate conversion.

The frame memory 3c has a storage capacity sufficient to store data received during at least one antenna rotation. A rated display controller (not shown) reads out data contents of the frame memory 3c at a high speed, and in synchronization with a scanning of display 4.

Figure 5:
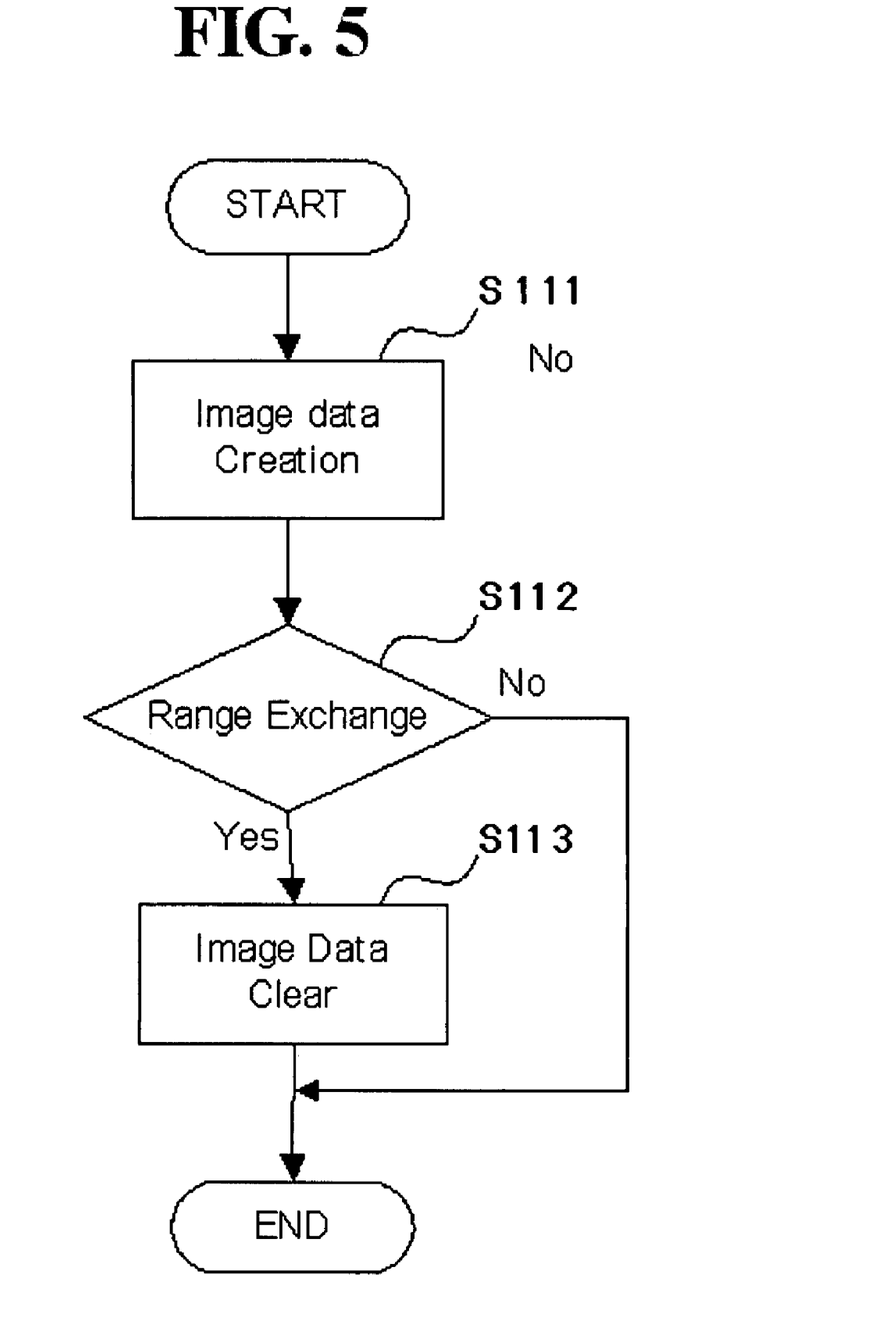
FIG. 5 is a flow diagram illustrating operations for a signal transferring process in a conventional radar apparatus.

When the conventional radar apparatus 101 is switched from one range (detection range) to another to change display range scale, target images stored on the previously used range are unusable because they do not fit the new range scale (the scale associated with the new range). Hence, to store new target images on the new range scale, it is necessary to erase all the previously stored target images. As illustrated in FIG. 5, which is a flow diagram illustrating operations for a signal transferring process in the conventional radar apparatus, image data is received/created by signal processor 3 in step S111. A test is performed (S112) to determine whether a range exchange is being performed. If no range exchange is performed, image processing continues through the frame memory 3c to display 4. If, however, an exchange in range scale is performed, previous image data associated with the old range is cleared (S113).

Thus, in a conventional radar apparatus a problem occurs in that an operator of the radar system cannot recognize target ships or movements of target ships for a period of time after switching the range scale. If past target images are preserved even when the range scale has been switched, the preserved past target images might be reused when the radar apparatus is switched back to the exact original range. The preserved past target images are unusable, however, if a newly selected range differs only slightly from the original range. Hence, if the radar apparatus is switched to a range slightly different from the original range, preserved past target images from the original range are still unusable.

One way to address this problem is to prepare a plurality of frame memories, to simultaneously store target images corresponding to a plurality of ranges. This approach, however, is economically difficult to implement because of a high associated cost.

Disclosed embodiments of this application address these and other issues by implementing methods and apparatuses to process signals when a range scale is switched. In embodiments of this application, when a range scale is switched, past target images that have been stored in the former range scale are converted to fit the new range scale, so that the past target images can be continuously displayed in the new range scale. Hence, previously stored past target images in the former range scale are not erased, and can continue to provide imaging information. Embodiments of this application can be used for various sensing systems including radar and sonar systems, to process signals of various types and origins.

SUMMARY OF THE INVENTION

The present invention is directed to methods and apparatuses that process sensing signals. According to a first aspect of the present invention, a method for redrawing a sensing image when a range is or has been changed comprises:

recording the sensing image and outputting the sensing image to a display; recording additional information displayed upon a screen and outputting the additional information to the display; computing a new image from the recorded sensing image using an image manipulation computer function, so that the computed image fits a new scale of the changed range, and recording the computed image; and computing changes to the recorded additional information to adjust the additional information to the new scale of the changed range, and recording the computed additional information.

According to a second aspect of the present invention, a method of displaying a radar image comprises: (a) frequently transferring image data from one area to another area at a predetermined cycle; (b) transferring the image data from the one area to another area when a radar range is or has been changed, including expanding or shrinking the image data when the radar range is or has been changed; and (c) re-transferring the processed image data back to the one area.

According to a third aspect of the present invention, a radar and like apparatus comprises: at least one frame memory for storing image data and outputting processed image data to a display; and a controller for frequently transferring the image data from one area to another area at a predetermined cycle, wherein the one area is included in the at least one frame memory, when a radar range is or has been changed, transferring the image data from the one area to the another area while expanding or shrinking the image data, based on the changed range, and re-transferring the processed image data back to the one area.

According to a fourth aspect of the present invention, a radar and like apparatus comprises: a frame memory; a video memory; and a controller for frequently transferring image data from the frame memory to the video memory at a predetermined cycle, transferring the image data from the frame memory to the video memory when a radar range is or has been changed, including expanding or shrinking the image data using an image manipulation computer function, when the radar range is or has been changed, and re-transferring the processed image data back to the frame memory.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Aspects of the invention are more specifically set forth in the accompanying description with reference to the appended figures.

Methods and apparatuses of the present invention will be next described in the context of radar systems. However, the principles of the current invention apply equally to other sensing systems such as, for example, sonar systems, SOFAR systems, radio systems, LIDAR systems, and other systems that receive and process signals.

Figure 3:
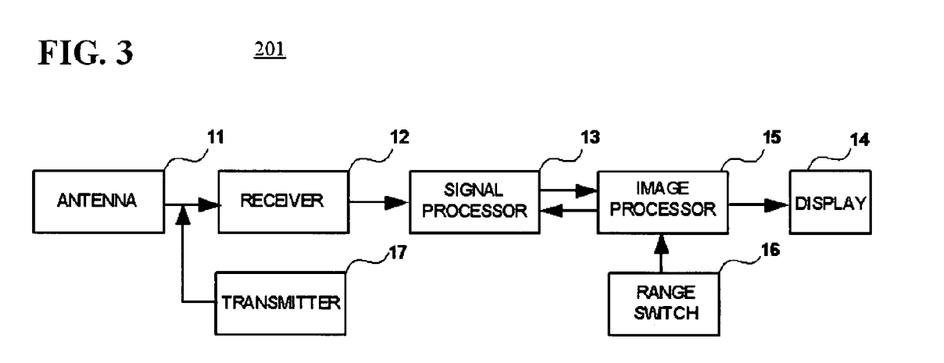
FIG. 3 is a block diagram illustrating a radar apparatus according to an embodiment of the present invention.

FIG. 3 is a block diagram illustrating a radar apparatus according to an embodiment of the present invention. The system 201 illustrated in FIG. 3 includes the following components: an antenna 11; a receiver 12; a signal processor 13; an image processor 15; a transmitter 17; a range switch 16; and a display 14. Operation of the system 201 in FIG. 3 will become apparent from the following discussion.

The antenna 11 transmits and receives signals, which may be electromagnetic signals, acoustic signals, or other types of signals. Examples of signals that can be transmitted and received by antenna 11 are electromagnetic signals reflected by various objects, acoustic echo signals reflected from fish, seabed, underwater rocks, etc. The antenna 11 may rotate at a specific speed in a horizontal plane, to transmit pulses of radio waves at a specific pulse repetition rate, and receive echoes of radio waves reflected by various targets. The antenna 11 may be configured in a similar fashion to the antenna 1 in the conventional radar apparatus illustrated in FIG. 1.

The receiver circuit 12 detects and amplifies signals received by the antenna 11. The signal processor 13 processes signals received from receiver 12, and sends processed signals to image processor 15. Processed images/signals are output and displayed on display 14.

Processed images/signals may also be printed using a printing unit (not shown). The printing unit may be, for example, a conventional color laser printer, a black-and-white printer, etc. In addition or as an alternative to generating a hard copy of the output of the radar system 201, the processed signal/image data may be returned as a file, e.g., via a portable recording medium, a CD-R, a floppy disk, a USB drive, or via a network. The output of radar system 201 may also be sent to a database that stores signal processing results, to an application that uses signal processing results from radar system 201, etc.

The radar apparatus 201 receives signal data from outside objects, and processes signals in a manner discussed in detail below. The radar apparatus 201 processes signals at multiple range scales. When a range is switched for the radar apparatus 201, past target images that have been stored in the former range scale are converted to fit to the new range scale, such that the past target images can be displayed continuously in the new range scale.

A user may view outputs of radar apparatus 201, including intermediate processing results of signals, via display 14, and may input commands to the radar apparatus 201 via a user input unit (nor shown).

In addition to performing processing of signals in accordance with embodiments of the present invention, the radar apparatus 201 may perform additional signal and image processing and preparation operations, in accordance with commands received from the user input unit. Such signal preprocessing and preparation operations may include known operations for signal amplification, quantization, compression, etc.

Figure 4:
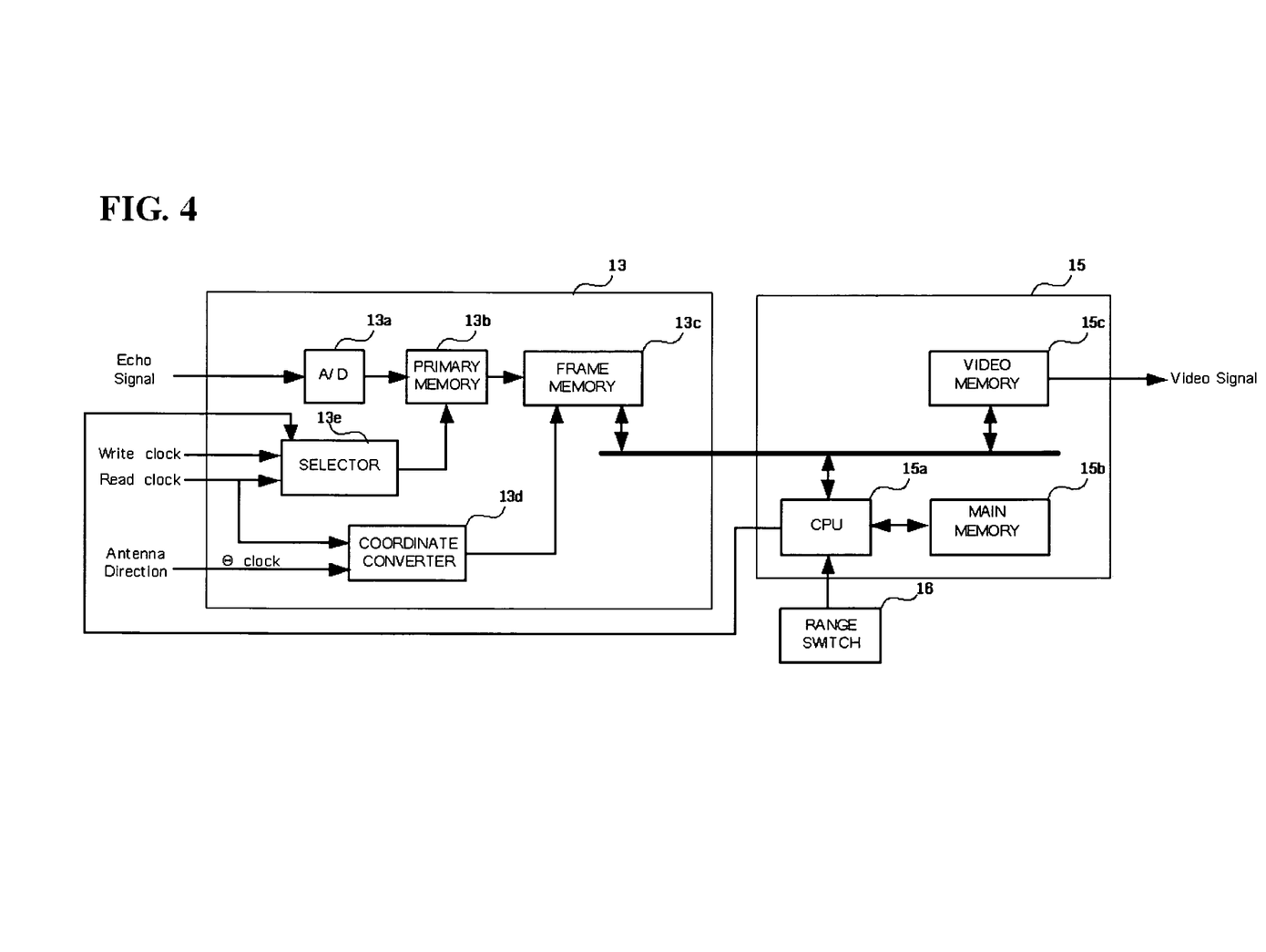
FIG. 4 is a block diagram illustrating exemplary aspects of a signal processor and an image processor in a radar apparatus according to an embodiment of the present invention illustrated in FIG. 3.

FIG. 4 is a block diagram illustrating exemplary aspects of a signal processor and an image processor in a radar apparatus according to an embodiment of the present invention illustrated in FIG. 3. As shown in FIG. 4, an exemplary signal processor 13 of a radar apparatus 201 according to this embodiment includes: an A/D converter 13a; a primary memory 13b; a frame memory 13c; a selector 13e; and a coordinate converter 13d. An exemplary image processor 15 of radar apparatus 201 according to this embodiment includes: a video memory 15c; a main memory 15b; and a CPU 15a. A range switch 16 communicates with the CPU 15a.

The A/D converter 13a, primary memory 13b, selector 13e and coordinate converter 13d may function in a similar fashion to the A/D converter, primary memory, selector and coordinate converter in the conventional radar apparatus illustrated in FIG. 1.

New data (received data) output from the primary memory 13b is stored in the frame memory 13c. Data storing is performed frequently, in a reception sweep cycle.

The image processor 15 processes data received from signal processor 13, and controls various parameters for image and data processing. The video memory 15c stores received data from the frame memory 13c, processed by a controller. In the current invention, the data located in the frame memory 13c and transferred to the video memory 15c may be image data, signal data, areas in the frame memory 13c, etc. Operation of the radar apparatus according to the current invention are described in the context of image data, but the operations can similarly be applied to signal data, areas in the frame memory 13c, etc.

CPU processor 15a processes the data and sets the range parameters associated with the currently used range scale. CPU processor 15a accepts data from the frame memory 13c, and transfers the data to video memory 15c. CPU 15a performs data transferring continuously, in a predetermined cycle. The main memory 15b temporarily stores CPU processing data.

Hence, the CPU processor 15a transfers the data stored in one memory to another memory. Specifically, the CPU 15a transfers data stored in video memory 15c to frame memory 13c, and transfers data stored in frame memory 15c to video memory 15c. Display unit 14 displays data stored in the video memory 15c.

The image processor 15 performs data processing according to the present invention, as described below.

The CPU 15a performs two types of data processing operations. Specifically, the CPU 15a performs a data transferring operation between the signal processor 13 and the image processor 15. The CPU 15a also performs processing operations for a changing range process when the range scale is switched. Image processing operations for a changing range process may be performed with or without image smoothing.

CPU 15a may perform a changing range process without image smoothing when the range scale is switched. To perform a changing range process without image smoothing, the CPU processor 15a transfers, in a first step, data from the frame memory 13c to the video memory 15c, to cover an area associated with a new range. The CPU processor 15a then re-transfers the data stored in the video memory 15c back to the frame memory 13c in a second step, when the display range scale is changed or has been changed.

CPU 15a may also perform a changing range process with image smoothing, when the range scale is switched. To perform a changing range process with image smoothing, the CPU processor 15a successively reads out and transfers data residing in the frame memory 13c to the video memory 15c multiple times, at a high frame rate. During these transfer steps, the memory area for transferring is adjusted according to the changed (new) range. Hence, the transferring area becomes larger or smaller with each transfer, depending on the relationship between the old range and the new range. Hence, the transferring area gradually expands or shrinks from the former (old) range, until the area reaches a size appropriate to the changed (new) range. In this manner, intermediate pictures can be created and inserted at a high frame rate. When the CPU processor 15a completes all the transfers to reach an image size appropriate to the changed (new) range, the CPU processor 15a re-transfers the data stored in the video memory 15c back to the frame memory 13c. Upon completion of data transfer, normal operation is resumed on the new range scale.

Hence, when the range scale has been changed, past target images which have been drawn and stored in the memory of the radar apparatus are converted to fit to a new range scale, for display until new one-sweep data is input into the radar apparatus. With this technique, past target images can be displayed in continuity on the new range scale without erasing previously stored past target images on screen. This display operation is performed smoothly by creating and inserting intermediate pictures at a high frame rate.

CPU 15a also performs a data transferring process after image smoothing, when the range is not changed anymore. To perform a data transferring process after image smoothing, at a constant range scale, the CPU processor transfers data residing in the frame memory 13c to the video memory 15c continuously, at a predetermined cycle. The transferring area remains fixed at the current range (setting range) as long as no range change happens. With these operations, a current picture image is transferred from the frame memory 13c to the video memory 15c.

A range (a detection range) is selected by range switch 16. The detection range is communicated to the CPU 15a. The CPU 15a then outputs a write and/or read clock signal to selector 13e, in accordance with the selected range. When the range scale is switched by operating the range switch 16, CPU 15a sets the transferring area in the frame memory 13c. Hence, the current-image data is stored in the frame memory 13c based on the current detection range.

Figure 6:
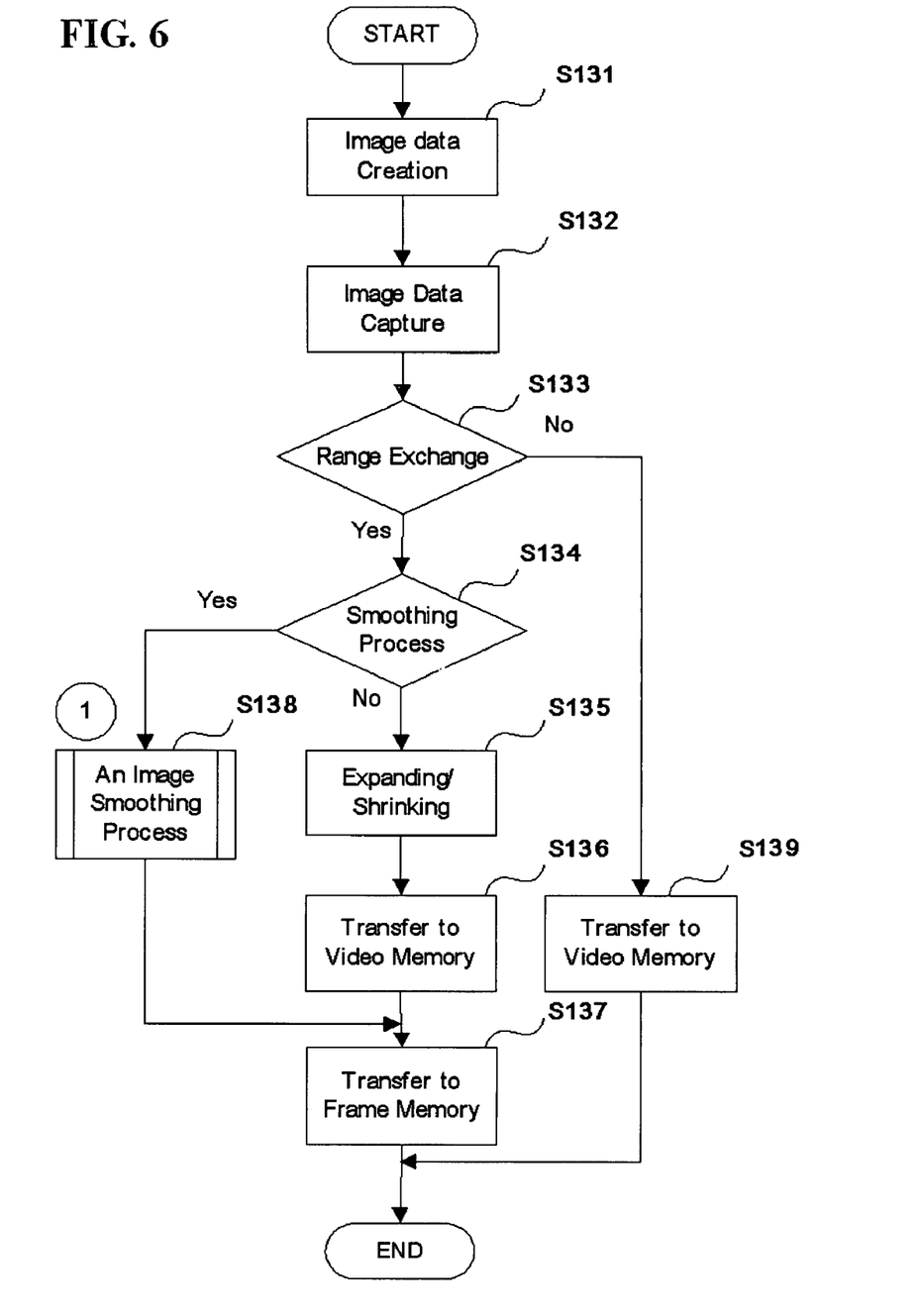
FIG. 6 is a flow diagram illustrating operations performed by a radar apparatus for a signal transferring process according to an embodiment of the present invention illustrated in FIG. 4.

FIG. 6 is a flow diagram illustrating operations performed by a radar apparatus 201 for signal transferring processes according to an embodiment of the present invention illustrated in FIG. 4. As illustrated in FIG. 6, image data is created (S131). The image data is captured using antenna 11 and receiver 12, and is received by signal processor 13 (S132) in the frame memory 13c. A test is performed to determine whether a range exchange is about to occur (S133). If no range exchange is about to occur, data from the frame memory 13c is transferred to the video memory 15c (S139) for display on display 14.

If a range exchange is to be performed (S133), a test is performed to determine whether a smoothing process will be performed (S1134). If no smoothing process will be performed, the data in the frame memory 13c is expanded or shrunk to fit the new scale range (S135). The expanded/shrunk data is then transferred to the video memory 15c (S136).

Alternatively, an image smoothing process may be performed (S138) to obtain final data that fits the new range scale. The final data is then transferred to the frame memory 13c (S137) from the video memory 15c.

Figure 7:
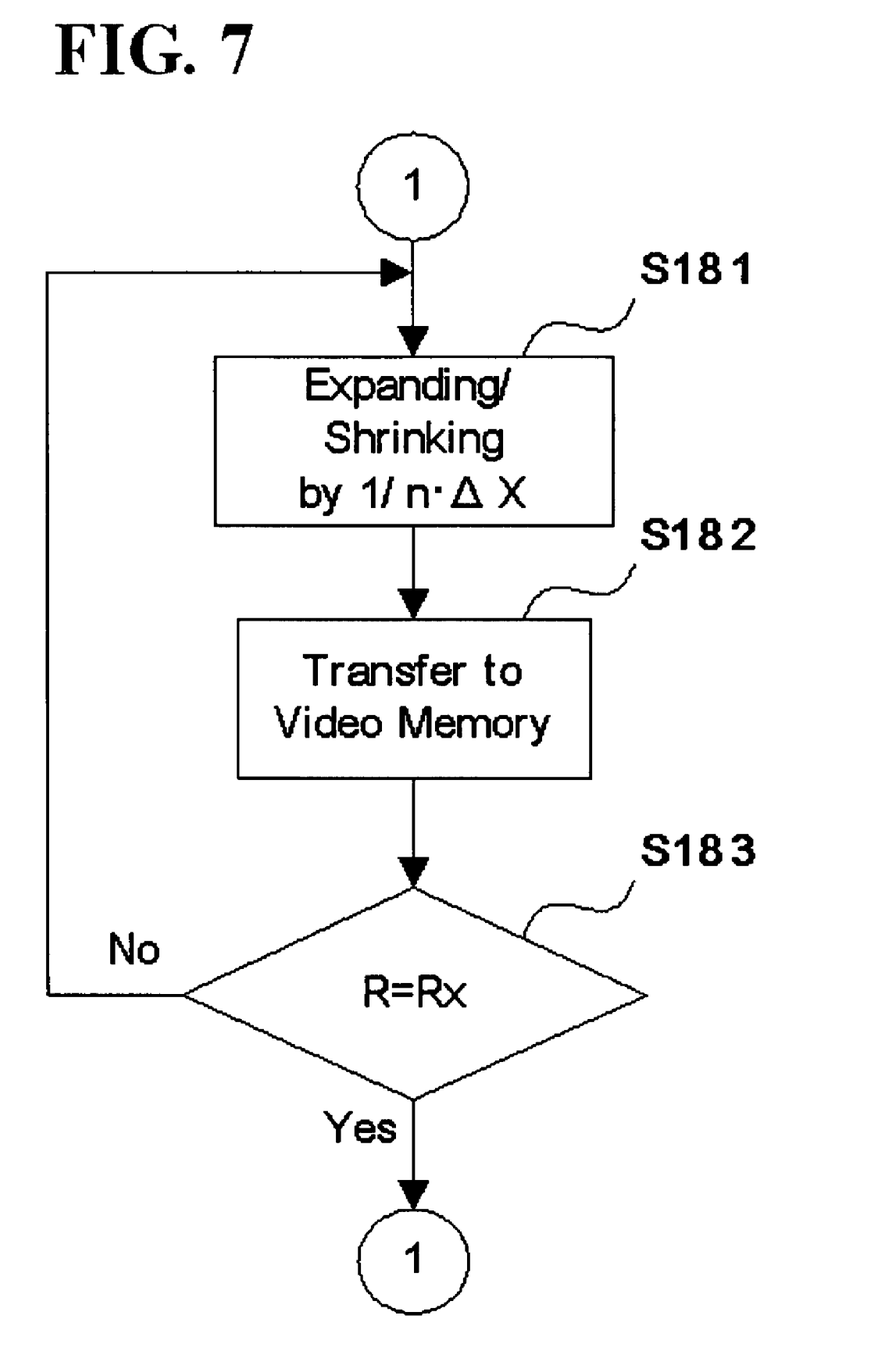
FIG. 7 is a flow diagram illustrating an image smoothing process performed by a radar apparatus according to an embodiment of the present invention illustrated in FIG. 6.

FIG. 7 is a flow diagram illustrating an image smoothing process performed by a radar apparatus according to an embodiment of the present invention illustrated in FIG. 6. FIG. 7 illustrates details of step S138 in FIG. 6.

When the range is switched, that is, when the range scale is or has been changed, a changing range process with image smoothing may be performed. During this process, the CPU processor 15a transfers the data, located in the frame memory 13c, to the video memory 15c multiple times at a high frame rate. During each transfer, the transferring area becomes larger or smaller, depending on the relationship between the old range Ro and the new range Rx. The transferring area begins to expand or shrink from the size it had in the former range Ro, until the transferring area reaches a size appropriate to the new (changed) range Rx.

The expanding/shrinking factor for an image may be given by $1/n \cdot \Delta X$ (step 181), where $\Delta X$ is the amount of a range change ($\Delta X = Rx - Ro$), to obtain expansion/shrinkage of an image in one transfer process in which the image data becomes larger or smaller, and n is the number of times the image data has been expanded/shrunk by $1/n \cdot \Delta X$. The parameter $1/n \cdot \Delta X$ may be a predetermined step change, a small selected step change, or a predetermined small step change. After expansion or shrinking, the changed image data is transferred to the video memory 15c (S182). A test is performed to determine whether the changed data is appropriate for the scale of the changed range Rx (S183). If the expanded/shrunk image data is not yet appropriate for the scale of the changed range Rx, expanding/shrinking of the data continues. When the expanded/shrunk image data is appropriate for the scale of the changed range Rx, the smoothing process ends and the final expanded/shrunk image data is transferred to the frame memory 13c (step S137 in FIG. 6).

With this process, it is possible to create and insert intermediate pictures in the radar apparatus 201, at a high frame rate. When the range has been changed and the CPU processor 15a completes all the data transfers to adjust the image to the new range Rx, the CPU processor 15a transfers the data currently located in the video memory 15c back to the frame memory 13c.

CPU processor 15a continues image transferring processes after image smoothing has been completed and the range has been changed to the new range Rx. During these image transferring processes, the CPU processor 15a transfers the data in the frame memory 13c to the video memory 15c continuously, in a predetermined cycle. The transferring image area remains fixed at a setting range, as long as no range change occurs. Thus, a current-picture image from the frame memory 13c can be continuously transferred to the video memory 15c.

In a preferred embodiment of the current invention, transfer of the needed area of an image in the video memory 15c is performed by a bitblit* function. Other computer functions may also be used to transfer a selected area of an image in the video memory 15c.

A Bit blit (also called bitblt*, blitting etc.) operation is a computer graphics operation. With a bit blit operation, several pattern data, such as, for example, bitmap image data, are combined into one pattern. Various operators, such as, for example, a raster operator, may be used in the bit blit operation. The bit blit function may be used with a Graphics Device Interface (GDI), for example. GDI is a Microsoft Windows interface that is used to represent graphical objects and to transmit graphical objects to various output devices such as monitors, displays, scanners, printers, etc. The bit blit function enables instant copying and pasting of an image, at any size, anywhere on a display or in a memory.

With the techniques illustrated in FIGS. 6 and 7, data stored in the frame memory 13c is scaled up or down during data transfer and re-transfer processes that are performed when the range scale is or has been changed. Consequently, an image that conforms to the newly selected range scale is stored in the frame memory 13c. During the processed illustrated in FIGS. 6 and 7, the display 14 continues to display a past target image even after the range has been changed. Hence, continuity in imaged information is obtained even when a range is changed.

Figure 8A:
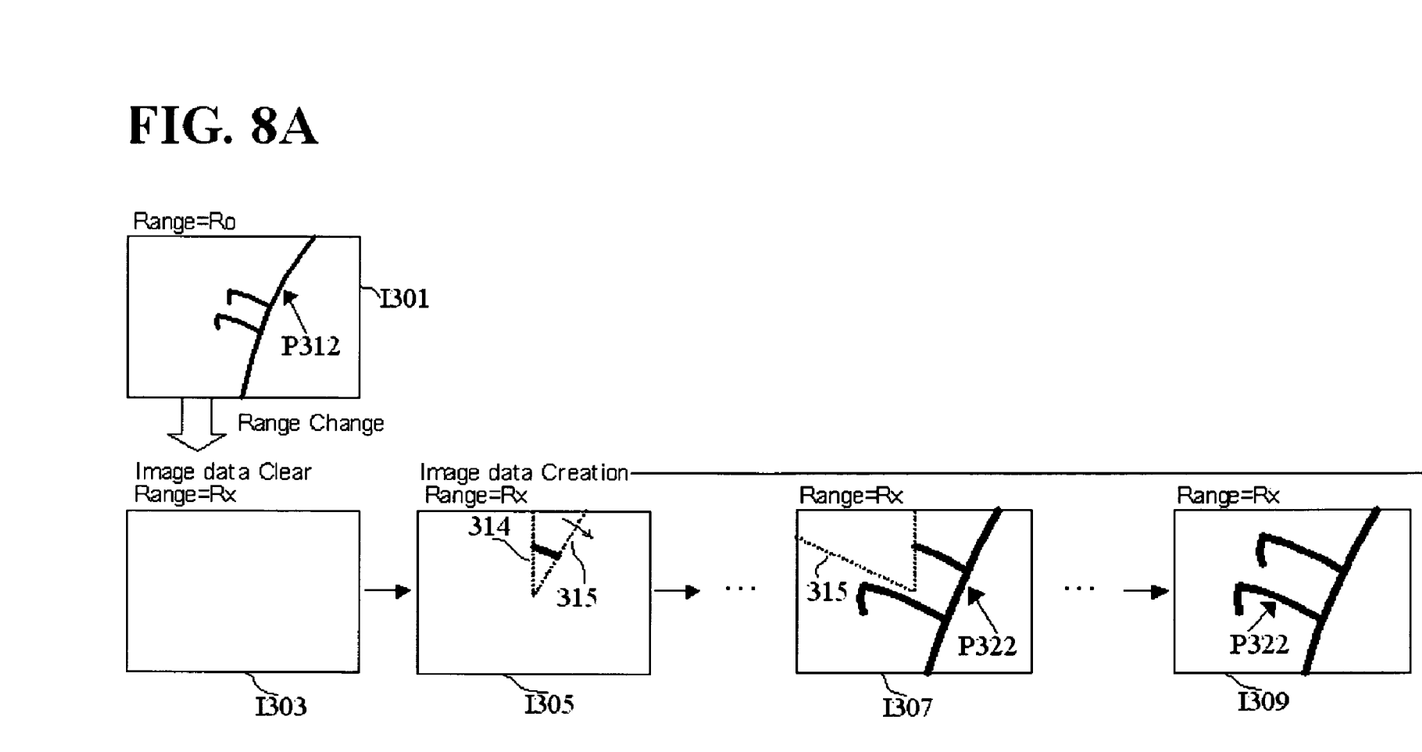
FIG. 8A illustrates aspects of an image transferring process when a range has been changed in a conventional radar apparatus.
Figure 8B:
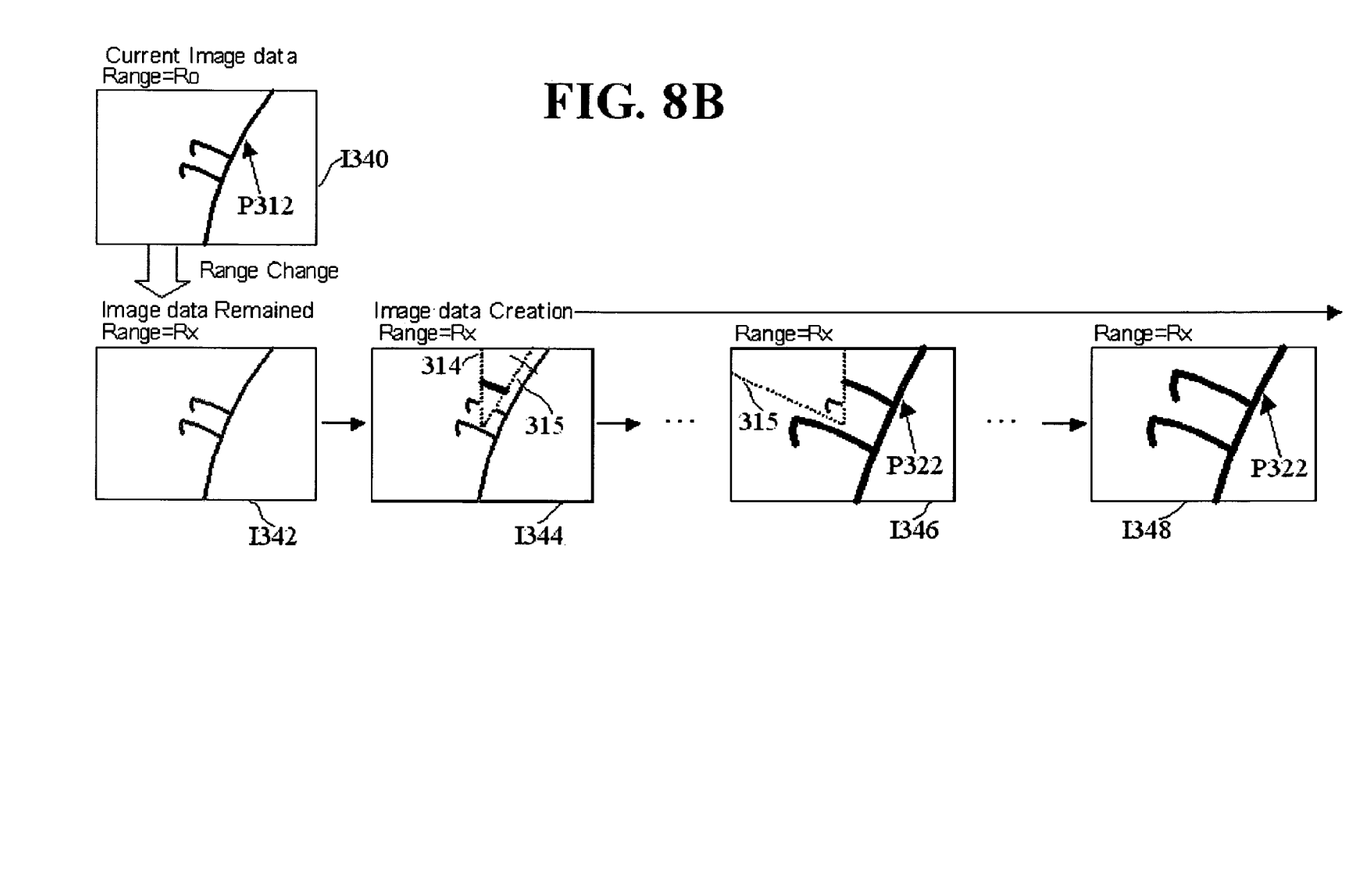
FIG. 8B illustrates additional aspects of an image transferring process when a range has been changed in a conventional radar apparatus.

FIG. 8A illustrates aspects of an image transferring process when a range is changed in a conventional radar apparatus. FIG. 8B illustrates additional aspects of an image transferring process when a range is changed in a conventional radar apparatus.

As illustrated in FIG. 8A, an image I301 illustrates an object P312 at an initial range Ro. When the conventional radar apparatus is switched from range Ro to another range Rx, the image at range Ro is cleared (image I303). Image data is then created at the new range Rx. Sweep line 315 starts at original sweep line 314 and covers the new range Rx, to sequentially create an image of object P322 at the new scale Rx. Images I305, I307 and I309 illustrate the creation of object P322 at the new range Rx.

FIG. 8B illustrates an alternative technique for generation of an image when a range is changed, in a conventional radar apparatus. As illustrated in FIG. 8B, an image I340 illustrates object P312 at an initial range scale Ro. When the conventional radar apparatus is switched from range Ro to a new range Rx, the old image at range Ro remains on the screen (image I342). New image data is then created at the new range Rx. Sweep line 315 starts at original sweep line 314 and covers the new range Rx, to sequentially create an image of object P322 at the new scale Rx, while deleting the frozen image from the scale Ro. Images I344, I346 and I348 illustrate the creation of object P322 at the new range Rx.

As can be seen in FIGS. 8A and 8B, when the conventional radar apparatus 101 is switched from one range (detection range) Ro to another range Rx to change display range scale, the target images stored on the previously used range Ro are unusable because they do not fit to the new range Rx scale. Hence, to store new target images on the new range Rx scale, all the previously stored unusable target images are erased.

Figure 9:
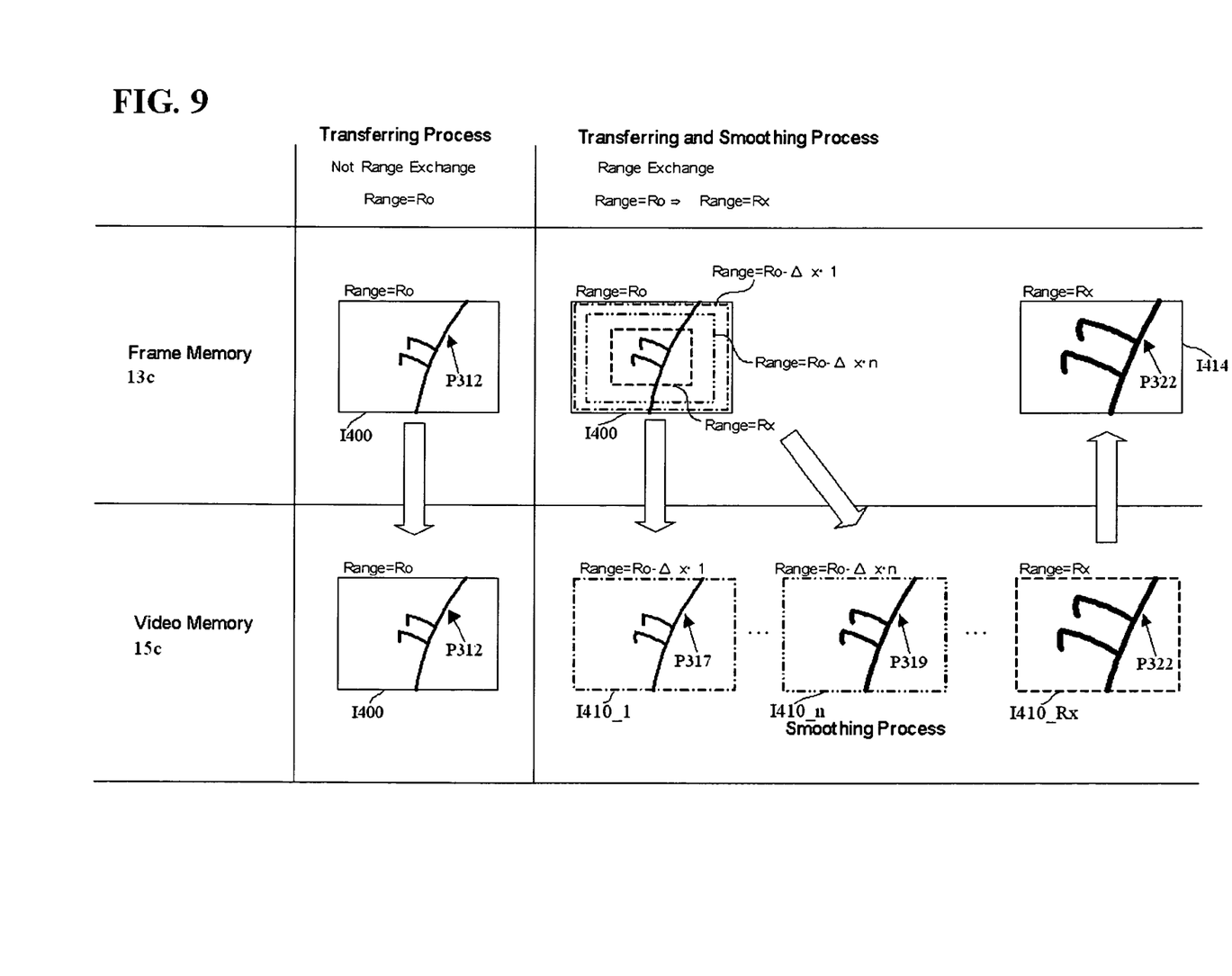
FIG. 9 illustrates exemplary aspects of transferring image processes with and without a scale-down operation performed by a radar apparatus according to an embodiment of the present invention illustrated in FIG. 6.

FIG. 9 illustrates exemplary aspects of transferring image processes with and without a scale-down operation performed by a radar apparatus 201 according to an embodiment of the present invention illustrated in FIG. 4.

As illustrated in FIG. 9, image transferring in the radar apparatus 201 is performed when the range scale does not change (no range exchange), or when the range scale changes (range exchange). When there is no range exchange, the range remains at Ro and image I400 containing object P312 is transferred unchanged from frame memory 13c to video memory 15c.

When the range is or has been changed from Ro to Rx, a smoothing process may be performed. During the smoothing process, the transferring area of image data becomes larger or smaller, depending on the relationship between the old range Ro and the new range Rx. For example, an expanded area I410_1 for range Ro−Δx·1 is first obtained from the initial image I400 and transferred from frame memory 13c to video memory 15c. Next, an expanded area for range Ro−Δx·2 is obtained and transferred from frame memory 13c to video memory 15c. Hence, an expanded area I410_n for range Ro−Δx·n is obtained and transferred from frame memory 13c to video memory 15c, where n represents the transfer number. In each of the transferred images, a successively smaller portion of initial object P312 (for example, P317, P319), at a successively larger magnification, is shown. The transfers continue until an expanded area I410_Rx for range Rx is obtained and transferred from frame memory 13c to video memory 15c. The expanded area I410_Rx represents an image associated with the changed range Rx. The image I410_Rx is finally transferred from video memory 15c to the frame memory 13c, to be used for range Rx. Image I410_Rx illustrates object P322 at range Rx.

If the range Rx changes such that a larger portion of the image is needed from range Ro to range Rx, the transferred images will be larger to illustrate more data than the initial image at range Ro.

Additional information displayed upon the radar screen may be recorded at range Ro. Such additional information may include radar rings, Automatic Radar Plotting Aid (ARPA) targets, and Automatic Identification System (AIS) targets, etc. During the range exchange operation, the recorded additional information can also be transferred and modified to adjust it to the new scale of the changed range Rx, as described in FIG. 9. The additional information and the initial image from the frame memory 13c can then be recorded and displayed together, at the intermediary ranges between Ro and Rx, or at the final range Rx.

With the methods illustrated in FIGS. 6, 7 and 9, full radar echo pictures can be instantly redrawn at a new range, automatically or as requested by a user. Redrawing of a full radar echo picture at the new range can be performed like an animation, as soon as a range change command or a redrawing command is sent to the signal processor 13 and to the image processor 15. Redrawing of full radar echo pictures is performed smoothly, by creating intermediary echo pictures at various intermediary ranges, and inserting the intermediate pictures at a high frame rate.

The methods and apparatuses of the present invention are applicable to various types of ships for which it is preferable to recognize movements of target ships continuously on a radar screen even when a radar range changes. The methods and apparatuses of the present invention can also be used on fishing vessels, for which it is desirable to watch movements of fish schools continuously, on a sonar screen.

The methods and apparatuses of the present invention may be combined with methods and apparatuses of U.S. Pat. No. 6,424,292 by Fujikawa et al., the entire contents of which are hereby incorporated by reference. In U.S. Pat. No. 6,424,292, a radar and like apparatus comprises a current-image video memory for storing most recently received data, a past-image video memory for accumulatively storing previously received data, an indicator for superimposing and displaying the data stored in both the current-image video memory and the past-image video memory, and a controller for transferring the data stored in the past-image video memory to a buffer in a first step and re-transferring the data stored in the buffer back to the past-image video memory in a second step when display range scale has been changed. Methods and apparatuses of the present invention may be used to process past target images such as echo trail (which displays both a present echo and the trace of a past echo) and to iteratively and smoothly adapt such past target images to a new changed range.

The methods and apparatuses of the present invention may be used with radar and sonar systems which store received echo signals defined in a polar coordinate system into a video memory having an array of memory elements arranged in the form of a Cartesian coordinate system to cover all directions in a horizontal plane. The radar and sonar systems then present the stored data on a raster-scan display screen. The methods and apparatuses of the present invention implement two image processing steps in a radar apparatus and the like. One step adjusts the transferring memory area depending on a changed range. The other step smoothes the transition image from a former range to the changed range, and displays the image data stored in the video memory. The methods and apparatuses of the present invention can be used on various sensing systems such as, for example, sonar systems, SOFAR systems, radio systems, LIDAR systems, and other systems that receive and process signals, to convert past target images that have been stored in a former range scale to fit a new range scale, so that the past target images can be continuously displayed in the new range scale. The signals used to obtain target images may be electromagnetic signals, acoustic signals, or other sensing signals.

Although detailed embodiments and implementations of the present invention have been described above, it should be apparent that various modifications are possible without departing from the spirit and scope of the present invention.

We claim:

1. A method for redrawing a sensing image when a detection range is or has been changed, said method comprising:
    recording a sensing image sensed at a first detection range and outputting said sensing image to a display;
    recording additional information displayed upon a screen and outputting said additional information to said display;
    when said first detection range is or has been changed to a second detection range, computing a new image from said recorded sensing image using an image manipulation computer function, so that said computed image fits a new scale of said second detection range, and recording said computed image; and
    computing changes to said recorded additional information to adjust said additional information to said new scale of said changed range, and recording said computed additional information.

2. The method as recited in claim 1, wherein said sensing image is a radar image, said range is a radar range, and said screen is a radar screen.

3. The method as recited in claim 2, wherein said additional information includes at least an Automatic Radar Plotting Aid (ARPA) target, an Automatic Identification System (AIS) target, or radar rings.

4. The method as recited in claim 1, wherein said image manipulation computer function is a bitblit function.

5. The method as recited in claim 1, wherein said image manipulation computer function transfers an area of said recorded sensing image to a memory, wherein said transferred area fits said new scale of said changed range.

6. The method as recited in claim 1, wherein said computed image and said computed additional information are displayed together on said display, on said new scale of said changed range.

7. The method as recited in claim 1, wherein said step of computing a new image from said recorded sensing image includes multiple computing sub-steps, wherein
    each computing sub-step computes an intermediate image to fit an intermediate scale between a former scale of a former range and said new scale of said changed range,
    said intermediate scale is obtained from said former range by changing to said new scale by a predetermined small step, and each computed intermediate image is recorded at a high frame rate in order to create smoothly expanding or shrinking images for said intermediate ranges.

8. The method as recited in claim 1, wherein said step of computing changes to said recorded additional information includes multiple computing sub-steps, wherein each computing sub-step computes an intermediate additional information to fit an intermediate scale between a former scale of a former range and said new scale of said changed range, said intermediate scale is obtained from said former range by changing to said new scale by a predetermined small step, and each computed intermediate additional information is recorded in order to generate as many corresponding frames.

9. A method of displaying a radar image, said method comprising:
(a) frequently transferring image data from one area to another area at a predetermined cycle;
(b) transferring said image data from said one area to said another area when a radar range is or has been changed, including expanding or shrinking said image data when said radar range is or has been changed; and
(c) re-transferring the processed image data back to said one area.

10. The method as recited in claim 9, wherein said transferring step frequently transfers an expanding or shrinking area of said image data to fit an intermediary range, said intermediary range being obtained from a former range by changing towards said changed range by a change step.

11. The method as recited in claim 9, wherein said transferring step may be performed with or without a smoothing process.

12. The method as recited in claim 9, wherein said transferring step computes an expanded or shrinking image data using a bitblit function.

13. A radar and like apparatus, said apparatus comprising:
at least one frame memory for storing image data and outputting processed image data to a display; and
a controller for
frequently transferring said image data from one area to another area at a predetermined cycle, wherein said one area is included in said at least one frame memory,
when a radar range is or has been changed, transferring said image data from said one area to said another area while expanding or shrinking said image data, based on said changed range, and
re-transferring the processed image data back to said one area.

14. The apparatus according to claim 13, wherein said controller frequently transfers said image data from said one area to said another area when a radar range is or has been changed, by computing an intermediary image to fit an intermediate scale between a former scale of a former range and a new scale of said changed range, wherein said intermediate scale is obtained from said former range by changing to said new scale by a small step, and wherein said intermediate image is an expanding or shrinking image obtained from said image data.

15. The apparatus according to claim 14, wherein said controller records each said intermediate image at a high frame rate in order to create a smoothly expanding or shrinking image for intermediate ranges.

16. The apparatus according to claim 13, wherein said controller records additional information displayed upon a radar screen and outputs said additional information to said display, computes changes to said recorded additional information to adjust said additional information to a new scale of said changed range, and re-transfers the processed additional information to said one area, for subsequent display of said processed image data and said processed additional information at said new scale of said changed range.

17. The apparatus according to claim 16, wherein said additional information includes at least an Automatic Radar Plotting Aid (ARPA) target, an Automatic Identification System (AIS) target, or radar rings.

18. The apparatus according to claim 13, wherein said controller expands or shrinks said image data, based on said changed range, using an image manipulation computer function such as a bitblit function.

19. The apparatus according to claim 13, wherein said another area is a video memory.

20. The apparatus according to claim 13, wherein, when a radar range is or has been changed, said controller transfers said image data from said one area to said another area while expanding or shrinking said image data based on said changed range, and records said processed image data at a high frame rate in order to create a smoothly expanding or shrinking image of intermediate ranges.

21. A radar and like apparatus, said apparatus comprising:
a frame memory;
a video memory; and
a controller for
frequently transferring image data from said frame memory to said video memory at a predetermined cycle,
transferring said image data from said frame memory to said video memory when a radar range is or has been changed, including expanding or shrinking said image data using an image manipulation computer function, when said radar range is or has been changed, and
re-transferring the processed image data back to said frame memory.

22. The apparatus according to claim 21, wherein said controller frequently transfers an expanding or shrinking area of said image data to fit an intermediate range, said intermediate range being obtained from a former range by changing towards said changed range by a change step.

23. The apparatus according to claim 21, wherein said controller can select to expand or shrink said image data with or without a smoothing process.

24. The apparatus according to claim 21, wherein said image manipulation computer function is a bitblit function.

25. The apparatus according to claim 21, further comprising:
a range switch for switching a range scale for said apparatus and for communicating said new range to said controller.

* * * * *